Figure 1:
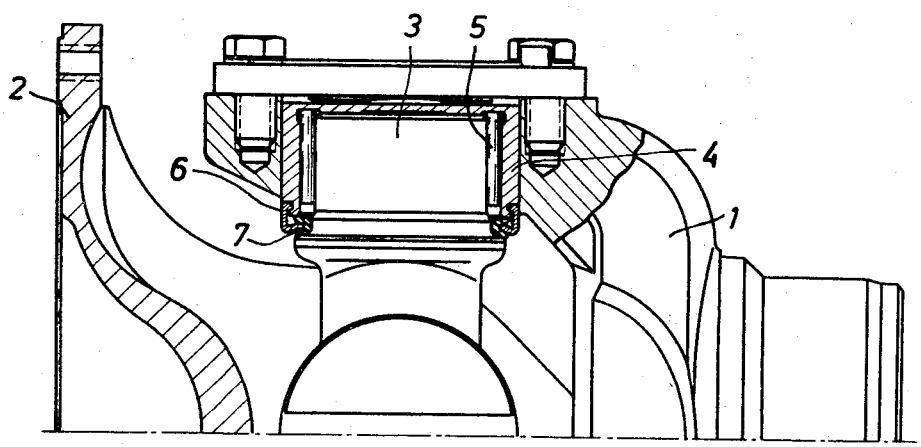

United States Patent [19]

Mangiavacchi

[11] 3,846,995

[45] Nov. 12, 1974

[54] SEALING DEVICE FOR USE IN UNIVERSAL JOINTS

[75] Inventor: Jacques Mangiavacchi, Chatou, France

[73] Assignee: Societe Anonyme: Glaenzer Spicer, Poissy, France

[22] Filed: Feb. 26, 1973

[21] Appl. No.: 335,891

[30] Foreign Application Priority Data
May 5, 1972 France .............................. 72.16142

[52] U.S. Cl. .............. 64/17 R, 308/187.2, 308/36.1
[51] Int. Cl. ............................................. F16d 3/26
[58] Field of Search ........ 64/17 A, 17 R; 308/187.2, 308/187.1, 207 R, 36.1

[56] References Cited
UNITED STATES PATENTS

| | | | |
|---|---|---|---|
| 2,996,901 | 8/1961 | Kleinschmidt ..................... | 64/17 A |
| 3,449,021 | 6/1969 | Palen ................................. | 308/36.1 |
| 3,457,732 | 7/1969 | Decouzon .......................... | 64/17 R |
| 3,588,129 | 6/1971 | Pitner ................................. | 64/17 R |

Primary Examiner—Benjamin W. Wyche
Assistant Examiner—Randall Heald
Attorney, Agent, or Firm—Baldwin, Wight & Brown

[57] ABSTRACT

A sealing device for the lubrated bearings in the yokes of a universal joint for the journals of the arms of the cross piece. The sealing device comprises a double-lipped rubber gasket and an annular L-shaped clip for retaining the gasket on the bearing. The gasket straddles the inwardly directed horizontal leg of the clip squeezing one of the lips against the end of the bearing. The other leg of the clip has a projecting detent cooperating with a groove in the periphery of the bearing for securing the clip to the bearing.

4 Claims, 2 Drawing Figures

PATENTED NOV 12 1974 3,846,995

SEALING DEVICE FOR USE IN UNIVERSAL JOINTS

Technical advances have led users of universal joints to use them for the transmission of greater and greater speeds. In addition, longer periods of maintenance-free operation of such joints are demanded.

For these two conditions to be satisfied, improved fluid-tightness of the universal joints is required especially with respect to the bearings.

A known improvement of the current technology consists in replacing the conventional sealing devices of cork by rubber gaskets with lips. However, the mere replacement of a cork member by a rubber gasket with lips will not in itself be sufficient unless it is accompanied by great precision in the assembly of the rubber gaskets.

The aim of the present invention is to provide a sealing device using lipped gaskets and enabling the assembly thereof with a high degree of precision and economically while also providing an additional protection against the risk of introducing foreign particles from the environment.

To this end, an object of the invention consists in a sealing device for universal joints having a lipped rubber gasket, comprising an annular clip surrounding each arm of the cross piece of the universal joint provided with an inner circular flange against which the lipped gasket is engaged, the annular clip being secured to the bearing coaxially surrounding the journal of the corresponding arm of the cross piece.

Figure 2:
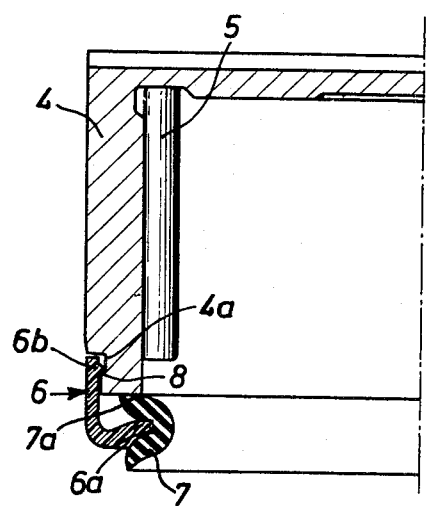

Other features and advantages of the present invention will be brought out in the description which follows by way of example only with reference to the accompanying drawing in which:

FIG. 1 shows a sectional view of an universal joint equipped with a sealing device according to the present invention; and FIG. 2 illustrates a detail of the assembly of FIG. 1 showing in section the sealing device fixed to the bearing.

FIG. 1 illustrates a conventional universal joint comprising yokes 1 and 2, a cross piece with four arms and four bearings 4.

The bearings 4 comprise in addition needle rollers 5 enabling a rotation relative to the cross piece 3 with respect to the bearings. The bearings are filled with a lubricant and the problem is to keep the lubricant inside the bearings while at the same time avoiding the introduction of foreign matter.

The sealing function is fulfilled by a conventional double-lipped rubber gasket 7.

In order to facilitate and make the mounting of the gasket 7 more precise, a device is provided comprising an annular clip 6 intended to secure the gasket 7 to the bearing 4.

The clip 6 is generally L-shaped in section. The gasket 7 is engaged along the inner flange 6a formed by the substantially horizontal leg of the L. The outer flange 6b defined by the vertical leg of the L comprises along its inner face a round detent 8 adapted to click into place in a groove 4a formed in the outer peripheral wall of the bearing 4. In addition, in order to limit the size of the device, the groove 4a is arranged so that the outer diameter of the clip 6 is slightly less than the outer diameter of the bearing 4.

Finally, the portion of the clip joins the two legs of the L section is slightly outwardly bulged to enable the lip 7a which is arranged between the clip 6 and the end of the bearing 4 to take its place more conveniently.

The clip 6 is preferably formed of plastic material.

Such a device enables the gasket 7 to be constantly maintained coaxial to the bearing 4 and forms bearings equipped beforehand with their sealing members and in a manner which is both precise and economical without running the risk of the rubber gasket coming out of position or deteriorating during the final assembly of the joint.

The present invention is, of course, not intended to be limited to the embodiment illustrated and described herein but on the contrary covers all alternatives, variations, modification and equivalents especially concerning the shape of the clip for securing the rubber gasket and the construction of the means for securing the clip to its bearing.

What we claim is:

1. A sealing device for use in universal joints of the type including a pair of yokes, a cross piece joining the yokes, the arms of the cross piece being mounted for rotation in bearings arranged in the yokes, comprising a lipped rubber gasket for sealing each bearing, an annular clip for retaining each gasket in position on its associated bearing, each said clip being secured to its associated bearing coaxial to the associated arm and having an inner circular flange engaging the lipped gasket, said annular clip being generally L-shaped in cross-section, and wherein the rubber gasket straddles the inner flange formed as the horizontal leg of the L-shaped section, the other vertical leg of the L-shaped section carrying securing means for cooperating with complementary securing means on the bearing to position each clip and rubber gasket axially relative to the associated bearing, the portion of said clip joining the legs of the L-shaped section being slightly bulged out for facilitating the positioning of the lip of the gasket to be gripped between said clip and said one end of the bearing.

2. A device according to claim 1, wherein the securing means on the vertical leg of the L-shaped section comprises at least one projecting detent, and wherein the complementary securing means comprises an annular groove arranged in the outer peripheral surface of the bearing.

3. A device according to claim 2 wherein said clip is formed of plastic material thereby facilitating the engagement of each clip over its associated bearing.

4. A device according to claim 2 wherein said detent has a sloping surface remote from its associated rubber gasket forming a wedging surface for facilitating snap positioning of the associated clip on its respective bearing.

* * * * *